(No Model.) 2 Sheets—Sheet 1.
J. F. STEWARD & R. H. DIXON.
GRAIN BINDER.
No. 267,119. Patented Nov. 7, 1882.
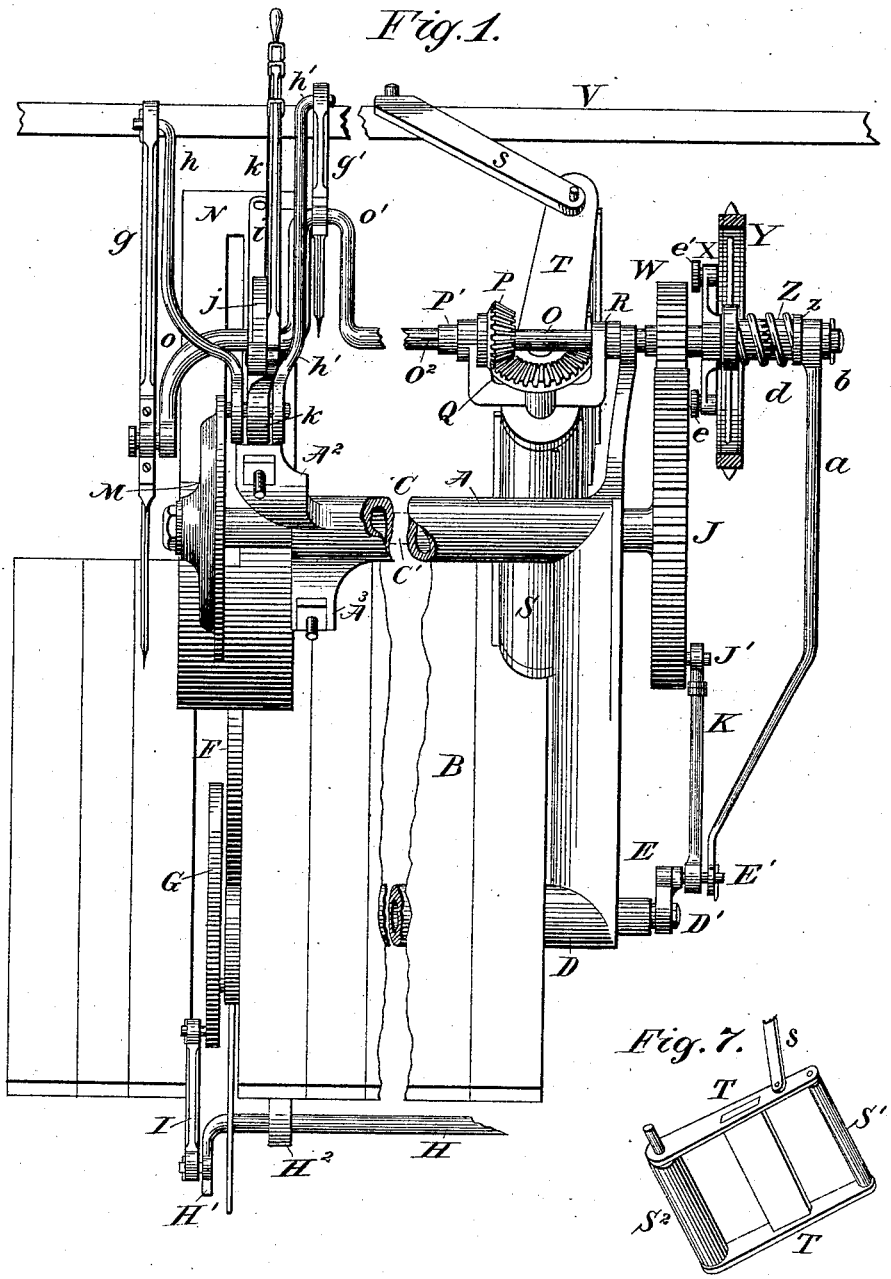
Witnesses.
John B Kaspari
Lawrence A Bealing
Inventor.
Robert H Dixon
John F Steward (No Model.) 2 Sheets—Sheet 2.
J. F. STEWARD & R. H. DIXON.
GRAIN BINDER.
No. 267,119. Patented Nov. 7, 1882.
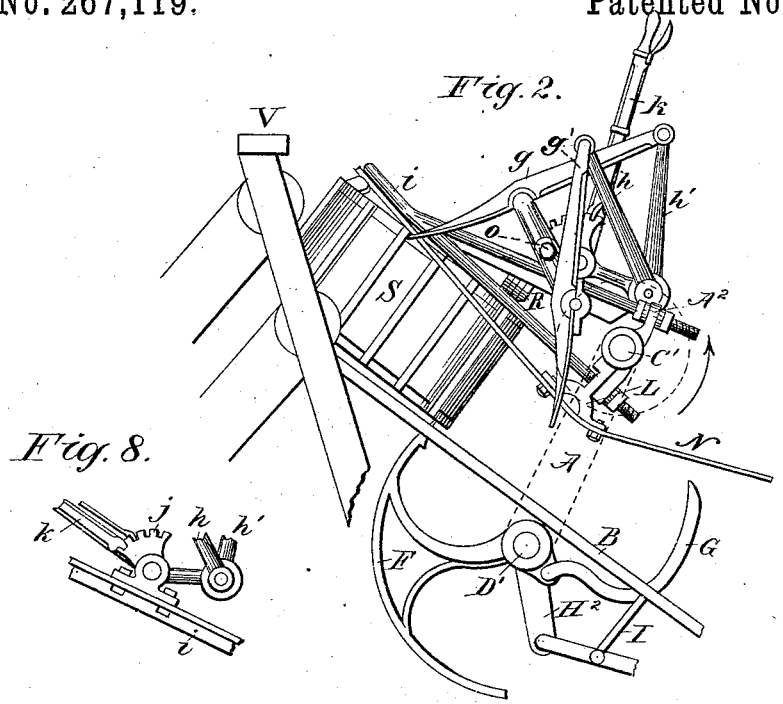
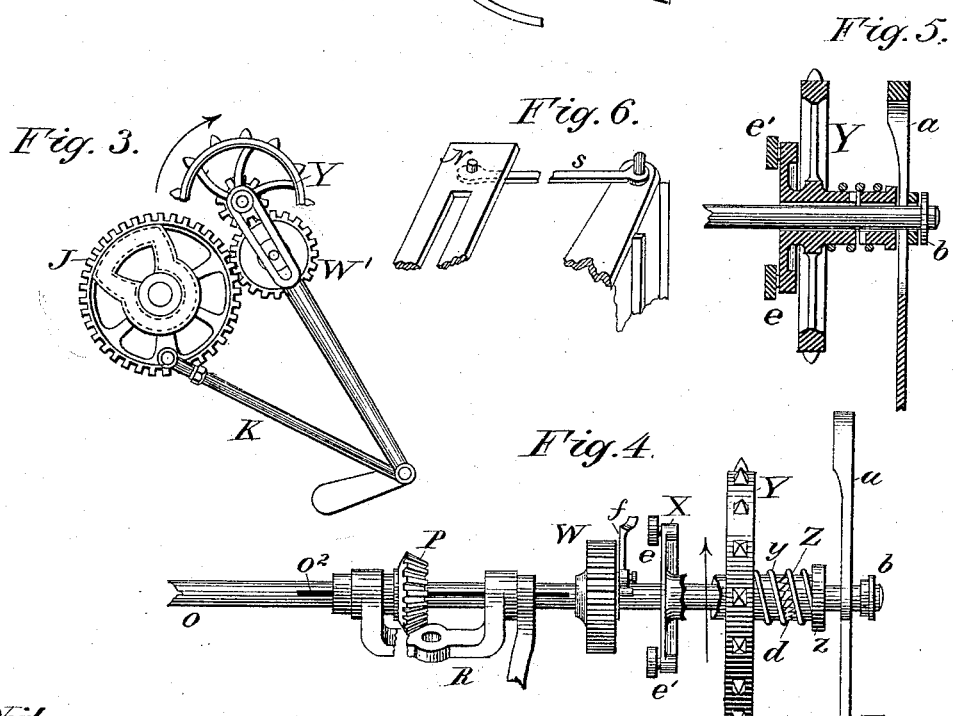
Witnesses.
John B. Kaspari
Lawrence A. Bealing
Inventor.
Robert H. Dixon
John F. Steward

UNITED STATES PATENT OFFICE.

JOHN F. STEWARD, OF CHICAGO, AND ROBERT H. DIXON, OF RAVENS-WOOD, ILLINOIS.

GRAIN-BINDER.

SPECIFICATION forming part of Letters Patent No. 267,119, dated November 7, 1882.

Application filed March 6, 1882. (No model.)

*To all whom it may concern:*

Be it known that we, JOHN F. STEWARD, of Chicago, and ROBERT H. DIXON, of Ravenswood, both in the county of Cook and State of Illinois, have invented certain new and useful Improvements in Grain-Binders, of which the following is a full specification, reference being had to the accompanying drawings, in which—

Figure 1 is a view taken from the outer side of and slightly above the edge of the binder; Fig. 2, a rear end view; Fig. 3, a detail front end view, showing the gearing for giving motion to the binding mechanism. Fig. 4 shows the packer-shaft, with all the parts mounted thereon distributed along its length in open order to better display them; Fig. 5, a sectional view of the driving sprocket-wheel. Fig. 6 shows one method of pivoting the top of the swinging adjuster; Fig. 7, a perspective of the adjuster-frame; Fig. 8, a detail of the mechanism for changing the path of rotation of the packers.

The object of our invention is to provide efficient means for compacting the grain received from the harvester into the receptacle into which it is to be bound, and against a compressor adapted to yield and trip the clutching mechanism for the purpose of making the binder wholly automatic, and to arrange an "adjuster" or "butting canvas" so that it shall be more efficient than those now in use, and in other devices and arrangement of devices hereinafter claimed as new.

Our invention is here shown as adapted to the form of binder shown in the patent to John F. Appleby, February 18, 1879, and numbered 212,420; but the arrangement will differ somewhat if adapted to other forms.

In the drawings, A is the standard for supporting all the parts of the binder. It is shown in Fig. 1 as shortened by having a part of its length broken out. Its length should be such that the "butter" may be in line with passing butts and the needle be central with the straw to be bound—in other words, that the band-tying devices shall be in the center of the grain-table. In Fig. 2 it is shown with all the operating parts in relative position to the harvester-elevator, or, more properly speaking, in relation to the approaching grain. It may be supported in any suitable manner that it or the harvester to which it is attached will admit.

B is the decking, forming the floor of the gavel-receptacle. The grain is discharged onto it by the usual delivery apparatus.

C is the hollow arm of the standard A, through which the knotter-operating shaft C' passes.

D is the hollow arm of the standard, through which the needle-shaft D' passes.

F is the needle.

E is a crank secured to the shaft D'.

G is the compressor, hinged to the heel of the needle, and connected to the rock-shaft H, having the crank H' by the link I. The shaft H is supported from the standard by the lug H².

J is a gear mounted on the knotter-operating shaft, and gives motion thereto, and by means of the connection K, mounted upon the wrist-pins J' of the gear J, and E' of the crank on the shaft D', which gives motion to the needle. M is a wheel mounted on the other end of the shaft C and secured thereto, and gives motion to the tying mechanism. In Fig. 2 this wheel is represented in dotted outline.

L is the tyer-frame, hung loosely on the shaft C, and connected to the breastplate N, as shown, and having its end made adjustable in relation thereto, as will be more fully set forth.

The shaft H receives its rocking motion from the wheel J. As this arrangement of the shaft H and its operation are well understood and form no part of this invention, we will not describe them, but refer to the patent cited above.

N is the breastplate, slotted for the passage of the point of the needle. This is supported by the tyer-frame L and the bracket *i*.

O is a shaft provided with the oppositely-disposed cranks *o* and *o'*. This shaft is journaled at a point between the opposing cranks *o o'* in a bearing *j* on the adjustable bracket *i*. The shaft is otherwise made straight and provided with the groove *o²*. On this shaft is mounted the sliding bevel-pinion P, provided with a feather. By connecting the pinion to the shaft in this manner it may move longitudinally thereupon, and yet be given rotation thereby. Mounted loosely on the shaft is also the frame R, which forms a bearing in which the hub of the pinion P may revolve. Properly speaking this frame is supported at both ends by the shaft O and slides on it.

Q is a bevel-gear mounted on and secured to the small shaft of the roller or drum $S^2$ and giving motion to the adjusting-canvas S. The shaft is journaled in the frame R.

T is a suitable frame for the adjuster-canvas. The rollers $S'$ $S^2$ are journaled in this frame. The adjuster is pivoted at its upper end, as hereinafter described, and the lower end is adjustable along the shaft O. Its upper end is connected by the link $s$ to the breastplate N. In Fig. 1 the link $s$ connects it to the top rail, V, of the harvester. It is preferable to connect it as in Fig. 6, because by so doing it is wholly connected with the binder.

W is a pinion mounted loosely upon the shaft O. It meshes with the gear $W'$, which in turn meshes with the gear J. $W'$ is but an intermediate to cause W and J to revolve in the same direction. It performs the same office that a chain would if thrown over the wheels W and J, if they were sprocket-wheels.

X is the driver, fixed to the sprocket-wheel Y, or cast as a part of its hub. Upon its ends are mounted the rollers $e$ $e'$, which engage with the dog $f$, pivoted on the wheel W. The dog is retained in proper position to be carried by whichever roller may engage with it by any suitable spring. The dog and driver constitute a form of automatic clutch in common use. (See also the patent referred to). Any automatic clutch will work equally well. The driving sprocket-wheel revolves freely on the shaft O. The hub of this wheel is supplied with the clutch-teeth $y$. We have then the wheel provided with clutching mechanism on either side.

Z is a clutch sliding slightly on and feathered to the shaft O. This clutch has a flange, $z$. Between this flange and the wheel Y, surrounding both, is the stout spiral spring $d$, the purpose of which is to force the clutch Z out of engagement when permitted so to do.

$b$ is a collar on the end of the shaft O.

$a$ is a slotted bar connected at one end to the wrist-pin $E'$. Its slot is made as wide as the diameter of the shaft, and moves on it.

The extreme end is thickened, as shown, and as this bar reciprocates along between the clutch Z and the collar $b$ it acts as a wedge to force the clutch to slide on the shaft, or withdraws, so that the spring may disengage the one from the other. The wheel Y rotates constantly, but the shaft O is not rotated unless Z engages with the clutch on the hub of the wheel Y. The driver X is fixed to the wheel Y, and unless the dog $f$ is engaged with it the pinion W is not rotated. The shaft O is bent so as to form, or is otherwise provided with the cranks $o$ $o'$. Upon these and carried by them are the packers $g$ $g'$, supported at their upper end by the adjustable links $h$ $h'$, and the lower or working ends are made so long as to reach below the breastplate and the points so directed as to be thrust over and into the approaching grain. The links $h$ $h'$ are pivoted at their lower ends to a lever, $k$, pivoted to the ratchet $j$, which is mounted on the bracket $i$. The lever has a latch-bolt, which locks it in any position.

The upper arm of the standard A has two lugs, $A^2$ and $A^3$, one above and one below. They have holes through them, and are so far separated as to form a good support for the brace-bracket $i$. This bracket is made strong, so as to form a support for the parts shown connected with it. Its upper branch is preferably made wide and ribbed, or made of T-iron. The lower branch may be round. They unite at the upper end and support the breastplate. Their lower ends are threaded for some distance and pass through the lugs $A^2$ $A^3$. The threaded ends of this bracket are provided with nuts, which serve two purposes, that of a fastening and as means of adjustment of the bracket, and with it the tyer-frame L, in relation to the wheel M. This wheel M is keyed to the shaft C, and is at rest while the binding mechanism is not in motion.

The frame by which the tyer is supported, and in which it is journaled, is supported from (by surrounding) the shaft C, and at the other end by being secured to the breastplate N. Now, this tyer-frame being secured to the breastplate, it will be seen that if the said breastplate is moved and the tyer-frame swung on the shaft C it changes the relation of the tyer-frame to the wheel M. The tyer, holder, and cutter being driven by this wheel, and being mounted in the tyer-frame, the relative movement of one or the other will change the time of operation of the parts—that is, if the wheel, revolving, as it does, in the direction indicated by the arrow in Fig. 2, engages the tyer and other parts to operate them early in its movement, it will be "fast." If the reverse is the case it will be "slow." The tyer-frame being adjustable, if moved downward—that is, toward the compressor—the parts referred to will be slow in their operation, and if adjusted upward they will be fast in their movement. By turning the nuts so as to lengthen the upper fork of the bracket $i$ the breastplate will be depressed, and with it the tyer-frame. By lengthening the lower in relation to the upper the reverse adjustment as to timing will take place. This adjustment is especially desirable in setting up the binder, and the necessity arises from variations in the parts. The adjustment of this bracket will effect somewhat the relative position of the breastplate and packers to the decking, but, being slight, will work no injury.

The binders using tripping mechanism are usually so constructed that they may be set to bind bundles of any uniform size by adjustment of the tripping-lever. We produce the same result by varying the stroke of the packers.

The links $h\ h'$ being sustained upon the lever $k$ at their feet, if the said end of the lever be moved downward the link will be moved in the same direction, and the working ends of the packers will then approach less near to the tripping-compressor, and thus the space into which the grain is packed will be larger, and hence more grain will accumulate before tripping. A reverse movement of the lever will of course produce a smaller bundle. The lever $k$ must be so located as to be within reach of the driver or attendant. It is locked in any position by the ratchet $j$ and latch on the lever.

The operation of our invention is as follows: The grain is delivered by the elevator or other means to the packers. A chain is thrown over the sprocket-wheel Y from any running-wheel of the harvester, so as to revolve it in the direction indicated by the arrow. The clutch Z engages with that on the hub of the wheel Y, and will give rotation to the shaft O, and the cranks will carry the packers through their movements and pack the grain against the trip or compressor. When this pressure becomes sufficient the clutching mechanism $f\ e$ will be engaged and the binding mechanism be put in motion, the wheel J will be rotated, and the shaft carrying the wheel M. The connection K will impart motion to the needle-shaft, and as soon as the crank E begins to move the slotted bar $a$ will be carried with it, and as soon as its wedge-shaped end passes far enough the stout spring $d$ will disengage the clutch Z and the shaft O be permitted to stop its rotation and the packers to remain at rest during nearly the whole movement of the binding mechanism. The grain will thus be not packed against the needle while it is across the throat formed by the deck and the breast-plate. When the revolution of the wheel J is completed and the slotted bar brought to the position shown in Fig. 1 the clutch Z will be forced into engagement with its mate and the packers be started.

The clutching mechanism for the binder proper does not differ in its operation from those now in common use, and needs no explanation. It is well shown in the patent before cited.

To direct the grain to such a position in relation to the needle as to present its middle to the twine, the adjuster is swung on its pivoted support, so that the pinion P may be adjustable anywhere along the length of the shaft O. If the lower end is moved toward the needle, it will carry short grain, as desired. This adjuster, by being operated as shown and described, is preferable to those in use, and the advantages possessed by it are due to its arrangement, and as this arrangement constitutes one part of our invention we will speak of it more definitely. It is constructed so as to connect this revolving apron to some part of the binder, preferably, as here shown, connected with the shaft O, so that it may act on the butts of the grain while upon the receptacle proper and on its way to the tying mechanism. The adjuster has heretofore in practice been connected with and operated by some part of the harvester. Motion was given to the roller S' continuously, and the result of running the canvas from this roller was this: If the grain fell in something of a mass, or if the canvas, by stretching, became a little loose, the obstruction would tend to retard it, and such retardation would slacken it around its driving-roller. This difficulty is great, and to overcome it we have made the adjuster a part of the binder and drive it from its lower end, so that any retardation of its movement on its operating-side—that side in contact with the butts of the grain—will have the effect of making it hug its driving-roller more closely, and thus the defect mentioned be wholly remedied.

In the matter of the intermittent adjuster we do not wish to limit ourselves to driving it from the packer-shaft, as any other intermittent shaft, or a special intermittent shaft, will answer.

We have shown no means for adjusting the butting-canvas along its shaft, deeming it not necessary, as any lever or screw, or any of the usual means for adjusting it, may be used. That shown by Olin in his patent of February 4, 1879, will answer a good purpose.

What we claim as our invention, and desire to secure by Letters Patent, is—

1. The binder frame or standard constructed, as described, to form a support for the binder, gearing, and the grain-packing and butt-adjusting mechanisms, substantially as set forth.

2. In a grain-binder, an adjusting device operating to engage and advance the butts of the grain and deflect it lengthwise on the receptacle while the gavel is being formed, combined with mechanism to operate the same, and to intermit during the operation of the binding mechanism, substantially as described.

3. The combination, with the binder mechanism, of an intermittingly-revolving shaft, and the grain-adjusting mechanism, arranged and operating substantially as described, whereby the shaft is started by the binder mechanism at or near the completion of its operation.

4. The combination of the intermittent shaft O, for carrying the packers, with the adjuster, also carried and operated by said shaft, substantially as described, whereby the packers and the adjuster have simultaneous intermittent movements.

5. The combination of the intermittingly-operated grain-adjusting mechanism with the intermittingly-operated binding mechanism, connected by means operating alternately, or each to cause the movement of one while the other is at rest.

6. The combination, with the wheel M, of the tyer-frame, supported from and made adjustable around the axis of the wheel, and the adjusting-bracket $i$, substantially as described.

7. The intermittingly-operated shaft O, with the cranks and packers, provided with the double alternately-operating clutching mechanism, in combination with intermittingly-operated binding mechanism, and the continuously-revolving wheel Y, substantially as described.

8. The combination of the packer-shaft, provided with its cranks carrying the packing-arms, the pinon P, sliding thereon, the pinion W, mounted loosely thereon, and the clutch Z, with the continuously-revolving wheel Y, carrying the described doubly-acting clutching devices, substantially as described.

9. In a grain-binder, the packing mechanism and means for adjusting the same at will, whereby the attendant may adjust their operative positions to vary the capacity of the receptacle for the purpose specified, substantially as described.

10. The combination of the cranks, the packers carried thereon, and the pivoted links $h\ h'$, connected to the heels of the packers, and means whereby the links are adjusted in relation to the axis of revolution of the cranks for changing at will the path of movement of the operating-points of the packers, substantially as described.

11. The combination, with the frame A, of the bracket $i$, forming a support for the shaft O, and for the links $h\ h'$, substantially as described.

12. The combination of the bracket $i$, the packer-shaft mounted thereon, and the lever $k$, the ratchet $j$, links $h\ h'$, and the packers, arranged and operated substantially as described.

JOHN F. STEWARD.
ROBERT H. DIXON.

Witnesses:
J. LONERGAN,
W. J. LUKENS.